July 10, 1956 P. C. BURCHETT 2,753,906
MANUALLY OPERATED NUTCRACKER
Filed Nov. 15, 1954
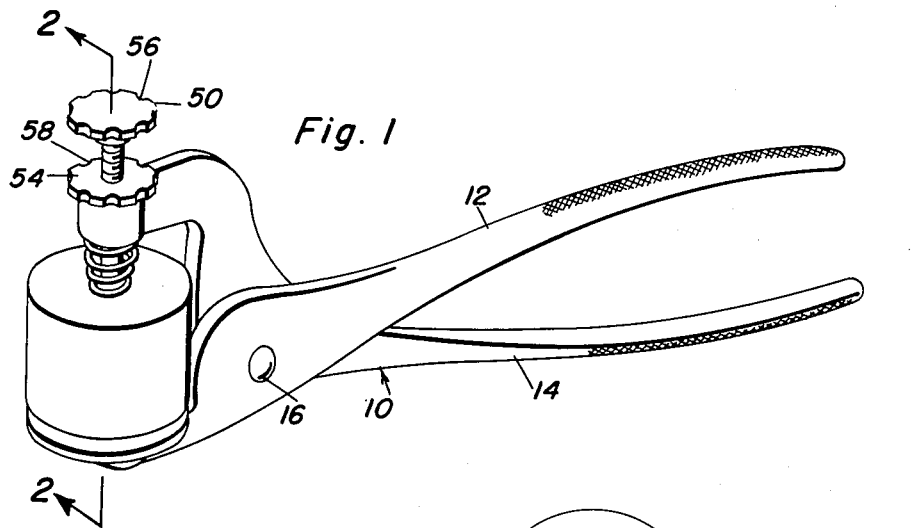
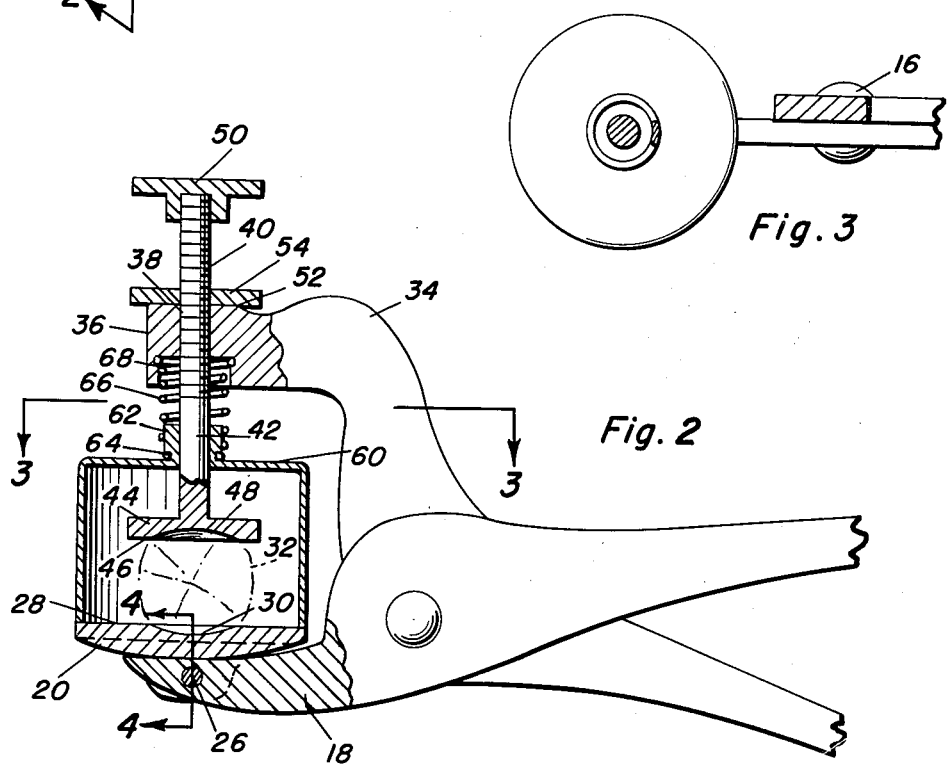
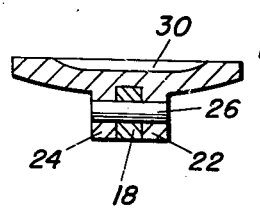
Paul C. Burchett
INVENTOR.
BY *Clarence A. O'Brien*
*and Harvey B. Jacobson*
Attorneys

United States Patent Office 2,753,906
Patented July 10, 1956

2,753,906
MANUALLY OPERATED NUTCRACKER
Paul C. Burchett, Ada, Okla.
Application November 15, 1954, Serial No. 468,831
2 Claims. (Cl. 146—16)

This invention relates to new and useful improvements in nutcrackers.

Heretofore, the cracking of nuts has been done with other devices that have attempted to retain the shells of the nuts, but the seemingly unavoidable scattering of shells and particles still remains to be cleaned up after cracking the nuts.

Therefore, the primary object of this invention is to provide a nutcracker that will retain all bits and particles of nutshells while cracking nuts.

Another object of this invention is to provide a quick and easy adjustment of the jaws of the nutcracker in order that any reasonable size nut may be cracked.

Still another object of this invention is to provide a stop on the nutcracker that will prevent the nut meat from being crushed with the shell.

Yet another object of this invention is to provide a nutcracker that will require no other tools to operate.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the nutcracker;

Figure 2 is an enlarged vertical fragmentary sectional view taken substantially along the plane of section line 2—2 in Figure 1;

Figure 3 is a horizontal sectional view taken along the plane of section line 3—3 in Figure 2; and Figure 4 is a vertical sectional view taken substantially along the plane of section line 4—4 in Figure 2.

Referring now more particularly to the drawings in detail it will be best seen in Figure 1 that a nutcracker, shown by the reference numeral 10, follows the general configuration of a pair of pliers, having an upper handle 12 and a lower handle 14, both handles 12 and 14 being elongated enough to ensure adequate leverage for cracking. The handles 12 and 14 are disposed in crossed relationship and are pivotally joined at their point of crossing by pivot pin 16. As is best seen in Figure 3, the pivot pin 16 is so constructed as to also retain the lateral faces of the handles 12 and 14 in a close face-to-face relationship, thus preventing unnecessary lateral motion of the handles during operation thereof.

As is best seen in Figure 2, the upper handle 12 is formed into a lower jaw 18 which has pivotally attached thereto a lower anvil 20. The lower anvil 20 is of generally circular configuration and, as best seen in Figure 4, has depending from its lower surface two tangs 22 and 24 which straddle lower jaw 18 and are pivotally attached thereto by means of a pin 26. Disposed symmetrically about the center of and on the upper face 28 of the lower anvil 20 is a recess 30 which is best seen in Figure 4. The purpose of the recess is to receive a nut 32 before the cracking operation begins and to hold it in a somewhat central location with relation to the anvil 28.

The lower handle 14 is formed into an upper jaw 34 having at its outer end and disposed directly above the lower anvil 20, an enlarged cylindrical portion 36. The cylindrical portion 36 has along its axis and perpendicular to the upper face 28 of the lower anvil 20 a threaded bore or hole 38 which receives a threaded portion 40 of a stem 42 which is integral with and upstanding from an upper anvil 44.

On the lower face 46 of the anvil 44 is a recess 48 which is centrally located on the face 46 and therefore disposed generally in line with and above the recess 30 in the lower anvil 20.

As is best seen in Figure 2, the threaded portion 40 extends above the cylindrical portion 36 and has attached at its outer extremity an adjusting nut 50 which when turned, causes the raising or lowering of the upper anvil 44 for the purpose of accommodating larger or smaller nuts as the case may be.

Threadedly engaged on the portion 40 and having a face-to-face relationship with the upper face 52 of the cylindrical portion 36 is a lock nut 54 which serves to lock the threaded portion 40 and with it the upper anvil 44 in any desired preset position.

As is best seen in Figure 1, the adjusting nut 50 and the lock nut 54 have roughened circumferential surfaces suitably formed, such as by notches 56 and 58, which alleviate the tendency of the fingers to slip on these members when adjusting and locking the nutcracker.

As seen most clearly in Figure 2, the lower portion of the stem 42 is not threaded and has slidably attached thereto an inverted cup-shaped guard 60 which has the same general lower diameter as the lower anvil 20 whose upper surface 28 it engages prior to the actual cracking of a nut.

A bushing 62, integral with and centrally located on the upper surface of the guard 60, acts as a guide for the guard 60 to confine its movement, with relation to the stem 42, to a direction parallel to the stem 42. The bushing 62 also has at its point of joining the guard 60 a groove 64 which receives the bottom coil of a spring 66. The spring 66 is spirally wound and its upper or larger end is received into an aperture 68 in the lower face of the cylindrical portion 36, the aperture 68 being concentric with the stem 42 and the bushing 62.

In operation, the handles 12 and 14 are opened, thus opening the anvils 20 and 44 and the guard 60. The opening or raising of the guard 60 is accomplished by the spring 66 which is attached on its upper end in the aperture 68 and on the lower surface of the cylindrical portion 36 and to the bushing 62 of the guard 60 on its lower end. The nut 32 is placed in the recess on the lower anvil and the handles are brought together. Here it will be seen whether any adjustment is necessary on the upper anvil 44. If the lower edges of the guard 60 are not making contact with the upper surface 28 of the lower anvil 20, then it will be necessary to raise the upper anvil 44 by releasing the lock nut 54, and turning the adjusting nut 50 until the edges of guard 60 make contact with the upper surface 28 of the lower anvil 20, after which the nut 54 is relocked. As the handles 12 and 14 are brought closer together, by squeezing with the hand, the angle between these handles decreases, and with it the angle between the jaws 18 and 34, but the upper anvil 48 and with it the guard 60 remains parallel to the lower anvil 20 because the lower anvil 20 pivots on pin 26, thus retaining all bits and particles of shell within the guard 60.

The guard 60, the bushing 62 and the spring 66 also act as a stop to prevent the upper anvil 44 from coming too far down and crushing the nut meat.

The handles 12 and 14 are now again opened, and the entire nutcracker tilted to one side or the other above a suitable container in which the shell particles and the nut meat may be caught, after which they may be separated.

From the foregoing, the contruction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A nutcracker comprising a pair of crossed handles pivotally secured together, upper and lower jaws presented by one end of the respective handles, a lower anvil carried by said lower jaw, an upper anvil carried by said upper jaw, said upper anvil including a threaded shank projecting through said upper jaw for adjustable movement toward and away from said lower anvil, an inverted cup-shaped guard carried by said upper jaw and slidable on said shank in surrounding relation to said upper anvil, said lower anvil being of such dimensions as to engage the peripheral lower edge of said guard and form therewith a complete enclosure, said threaded shank receiving thereon a threaded lock nut, said lock nut retaining said shank and said upper anvil in any desired preset position.

2. A nutcracker comprising a pair of crossed, pivotally interconnected handle members presenting, at adjacent ends thereof, an upper and a lower jaw, an upper anvil carried by said upper jaw, said upper anvil including a threaded shank projecting through and threadedly engaged with said upper jaw, a lower anvil in the form of a plate pivotally secured to said lower jaw about an axis parallel with the pivotal axis of said handles, an inverted cup-shaped guard surrounding said upper anvil and including a boss slidably received on said shank, a coil spring surrounding said shank and connected at opposite ends to said boss and said upper jaw for urging said guard into engagement with said lower anvil while a nut is being cracked and returning said guard to a fully open position after the nut has been cracked and said handle members are returned to a fully opened position.

References Cited in the file of this patent

UNITED STATES PATENTS

| | | |
|---|---|---|
| 1,219,859 | Paxton | Mar. 20, 1917 |
| 1,555,518 | Ramey | Sept. 29, 1925 |
| 1,883,529 | Buckwalter | Oct. 18, 1932 |
| 2,521,552 | Thompson | Sept. 5, 1950 |